United States Patent
Arsanjani et al.

(10) Patent No.: US 10,944,800 B1
(45) Date of Patent: Mar. 9, 2021

(54) QUEUING DATA COMMUNICATIONS IN A DATA COMMUNICATIONS NETWORK USING A VIRTUAL ASSISTANT

(71) Applicant: 8x8, Inc., San Jose, CA (US)

(72) Inventors: Ali Arsanjani, San Jose, CA (US); Bryan R. Martin, San Jose, CA (US); Manu Mukerji, San Jose, CA (US); Nick Holland, San Jose, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 16/218,039

(22) Filed: Dec. 12, 2018

(51) Int. Cl.
| *H04L 29/06* | (2006.01) |
| *H04L 29/08* | (2006.01) |
| *H04L 12/58* | (2006.01) |
| *G06F 16/332* | (2019.01) |
| *G06F 16/33* | (2019.01) |

(52) U.S. Cl.
CPC ...... *H04L 65/1069* (2013.01); *G06F 16/3329* (2019.01); *G06F 16/3349* (2019.01); *H04L 51/18* (2013.01); *H04L 51/28* (2013.01); *H04L 67/14* (2013.01); *H04L 67/32* (2013.01)

(58) Field of Classification Search
None
See application file for complete search history.

(56) References Cited

U.S. PATENT DOCUMENTS

| 7,979,840 | B2 | 7/2011 | Zhang et al. |
| 8,316,347 | B2 | 11/2012 | Arsanjani et al. |
| 8,332,813 | B2 | 12/2012 | Arasanjani et al. |
| 8,739,111 | B2 | 5/2014 | Allam et al. |
| 8,874,755 | B1 | 10/2014 | Deklich et al. |
| 9,171,319 | B2 | 10/2015 | Qu et al. |
| 2004/0122245 | A1 | 6/2004 | Franks |
| 2008/0027784 | A1 | 1/2008 | Ang et al. |
| 2016/0080428 | A1* | 3/2016 | Fan ........................ H04M 3/493 709/228 |
| 2016/0350674 | A1* | 12/2016 | Midboe ................. H04L 67/22 |
| 2016/0360039 | A1* | 12/2016 | Sanghavi ............ H04M 3/5183 |
| 2018/0032576 | A1* | 2/2018 | Romero ................. G06N 3/006 |
| 2018/0041378 | A1* | 2/2018 | Yan ........................ H04W 24/04 |
| 2018/0054524 | A1* | 2/2018 | Dahan .................. H04M 3/4938 |
| 2018/0176281 | A1* | 6/2018 | Arunachalam ......... H04L 65/80 |
| 2018/0324041 | A1 | 11/2018 | Deklich et al. |
| 2019/0042988 | A1* | 2/2019 | Brown ................ G06F 16/9535 |

* cited by examiner

*Primary Examiner* — Scott B Christensen
(74) *Attorney, Agent, or Firm* — Crawford Maunu PLLC (57) ABSTRACT

Certain aspects of the disclosure are directed to queuing data communications in a data communications network. According to a specific example, a user-data communication addressed to a client among a plurality of remotely-situated client entities, may be placed in a queue. The client entities may be configured and arranged to interface with a data communications server providing data communications services on a subscription basis. A virtual assistant session may be initiated, in which a dynamic series of inquiries may be presented to address the user-data communication while the position is maintained in the queue. The user-data communication may be terminated and removed from the queue in response to an indication that the user-data communication was addressed during the virtual assistant session, or routed via the data communications server in response to an indication that the user-data communication was not addressed during the virtual assistant session.

18 Claims, 4 Drawing Sheets

QUEUING DATA COMMUNICATIONS IN A DATA COMMUNICATIONS NETWORK USING A VIRTUAL ASSISTANT

OVERVIEW

Aspects of various embodiments are directed to queuing data communications in a data communications network. Data communications platforms have allowed individuals to transmit and receive data communications using broadband Internet connections in place of traditional telephone lines. A data communications endpoint device can use a broadband Internet connection to connect to a data communications server that is managed by a data communications service provider. The data communications server can handle communication routing and provide other data communications services for the data communications endpoint device.

Computing servers are increasingly being used to provide various data communications services over a network including, but not limited to, routing of Voice over Internet Protocol (VoIP) communications and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services. Network management systems, sometimes referred to as enterprise management systems, are often used to administer and monitor enterprise computer systems. These network management systems may have hundreds or thousands of settings, rules, and thresholds. The defaults for these settings, rules, and thresholds may be inaccurate and typically are not customized or tailored to a client entity. Because of inaccurate settings, rules, and thresholds, many network management systems provide inaccurate results, excessive amounts of unnecessary information, or irrelevant information and can fall into disuse over time.

Moreover, when a customer contacts a service provider, a first available customer service representative may work with the customer to respond to the communication. However, in some instances, such a customer service representative may be unavailable, and/or the customer may otherwise be routed to a message recording system. The customer's communication may be of an urgent nature or otherwise of high importance to the service provider, though without communication with the customer service representative, the communication may go unaddressed in a timely manner. Moreover, the customer service representative to which the communication was originally directed may lack the expertise to resolve the service issue for the customer. Accordingly, the customer service representative may have to route the customer to a different representative of the wireless telecommunication carrier in order to resolve the service issue. In rare instances, the customer may be routed to multiple new representatives in succession until the service issue is resolved. Such policies for handling customer care requests may leave a customer with the impression that the customer service representatives of the carrier are not dedicated to provide high quality customer service.

SUMMARY

Various example embodiments are directed to issues such as those addressed above and/or others which may become apparent from the following disclosure concerning systems and methods for queuing data communications in a data communications network.

Embodiments are directed toward methods for use in communications systems employing a data communications server operated by a communications provider, where the data communications server is on the data communications provider side, to provide data communications services to a multitude of client entities. In such contexts, the data communications server may be referred to as a data communications provider server. In such systems, the data communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues.

In accordance with the present disclosure, user-data communications corresponding to a user-generated message may be queued and handled by a virtual assistant, thereby improving user experiences. A user-data communication corresponding to a user-generated message, may be placed in a queue. The user-data communications may be addressed to a client among a plurality of remotely-situated client entities, where each of the plurality of remotely-situated client entities is respectively configured and arranged to interface with a data communications server providing data communications services on a subscription basis. A virtual assistant session may be initiated via the data communications server, while a relative position of the user-data communication is maintained in the queue. During the virtual assistant session, a dynamic series of inquiries may be presented to address the user-data communication while the relative position of the user-data communication is maintained in the queue. The dynamic series of inquiries may be modified based on responses received during the virtual assistant during the virtual assistant session, to identify an issue or topic associated with the user-data communication. The user-data communication may be terminated, and the user-data communication may be removed from the queue, in response to an indication that the user-data communication was addressed during the virtual assistant session. Additionally and/or alternatively, the user-data communication may be routed via the data communications server based on the relative position of the user-data communication in the queue, in response to an indication that the user-data communication was not addressed during the virtual assistant session.

A management circuit can correlate keywords or tones identified in the user-data communication with a particular issue or topic associated with the client to which the user-data communication was directed. The management circuit can be a module associated with a client-specific database and/or a plurality of client-specific databases, and configured and arranged to correlate identifiable aspects of user-data communications with a particular issue or topic. As such, a keyword or a tone may be identified from the user-data communication and compared to the client-specific database. The dynamic series of inquires may then be generated based on the comparison of the identified keyword or tone to the client-specific database. Similarly, the client-specific database and the dynamic series of inquires may be modified responsive to user feedback indicating a relevance of the dynamic series of inquiries to the issue or topic of the user-data communication. In such a manner, a machine learning-based algorithm may generate and modify the dynamic series of inquiries.

In another particular example embodiment, user-data communications corresponding to a user-generated message may be queued and handled by a virtual assistant, facilitated by an apparatus comprising a client-specific database and a client-specific communications server. The client-specific database may be configured and arranged to correlate identifiable aspects of user-data communications with a particular issue or topic associated with a client entity among a plurality of remotely-situated client entities, each of the plurality of remotely-situated client entities respectively configured and arranged to provide data communications services for a plurality of end-users having respective data communication devices including circuitry to facilitate the data communications services. The client-specific communications server may be configured and arranged to interface with the client-specific database and a data-center communications server providing the data communications services to the plurality of remotely-situated client entities on a subscription basis.

The client-specific communications server may queue data communications for the client entity, by placing in a queue, a user-data communication corresponding to a user-generated message, the user-data communication addressed to the client entity. A virtual assistant session may be initiated while a relative position of the user-data communication is maintained in the queue, and a dynamic series of inquiries may be retrieved from the client-specific database. The dynamic series of inquiries may address the user-data communication while the relative position of the user-data communication is maintained in the queue. The user-data communication may be terminated, and the user-data communication may be removed from the queue in response to an indication that the user-data communication was addressed during the virtual assistant session. Similarly, the user-data communication may be routed based on instructions in the client-specific database, based on the relative position of the user-data communication in the queue, and in response to an indication that the user-data communication was not addressed during the virtual assistant session.

In various example embodiments, the identifiable aspects of the user-data communications include at least one of a keyword, a tone, and a phrase. In such embodiments, the client-specific communications server is configured and arranged to queue data communications for the client entity, by receiving from an end-user from which the user-data communication originated, feedback indicating an extent to which the dynamic series of inquiries correspond with the issue or topic of the user-data communication. The client-specific database may then be updated for the client entity, in accordance with the received feedback.

At least one machine learning-based algorithm may be used to queue data communications in the data communications network. For instance, the data-center communications server may queue data communications for each respective client entity, by providing to each respective client entity, an option to specify a plurality of identifiable aspects that may be identified from user-data communications directed to the respective client entity, and the issue or topic correlated to each respective identifiable aspect. As an illustration, a particular client entity may specify project names and particular questions to be asked by the virtual assistant for particular projects. As another illustration, a particular client entity may specify key words or phrases that are associated with a known technological problem faced by customers, and a series of questions to be asked by the virtual assistant based on the known technological problem. Feedback from the customer and/or the client entity may improve the virtual assistant services, by implementing machine learning and/or artificial intelligence to further correlate key words and/or phrases and the like with particular issues and/or topics particular to the client entity.

As described herein, the data-center communications server may retrieve from data sources associated with the respective client entity, client-specific contextual information, including information pertaining to client relationships, particular projects of the respective client entity, or identified technological issues of the respective client entity. Such client-specific contextual information may supplement the client-specific database with the client-specific contextual information such that improved queuing may be provided by the virtual assistant. To further improve the queuing may be provided by the virtual assistant, the data-center communications server may provide a graphical user interface to the end-users of each respective client entity, including selectable options to view, add, remove, and/or update the correlations between the identifiable aspects of the user-data communications and particular issues or topics associated with the respective client entity.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving interactive routing of data communications. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Particularly, embodiments of the present disclosure are directed to techniques for using machine learning-based algorithms to queue data communications in a data communications network. This machine learning-based data communications queuing system may provide a proactive virtual assistant to rapidly assess the content, classification, severity, sentiment and/or topic of data communications and provide information and/or questions to the sending party to promptly address the communication. This machine learning-based data communications queuing system may, in some example embodiments, fully address the topic of the communication such that involvement of a customer service representative is not needed, and in other example embodiments, reduce the time and involvement of a customer service representative by gathering pertinent information from the customer up front. The proactive monitoring solution of the present disclosure can collect data into an event timeline, indicating topics and/or issues that were discussed in data communications, as well as key words, phrases, and/or tones that were used. By correlating aspects of the data communication, such as key words, phrases, tone, sentiment, and/or other recognizable features and correlating such features with the topics and/or issues that were discussed, predictive models can be created for the extrapolation of future data communications. Such data communications may consist of telephone calls, emails, text messages, chat messages, and the like.

In accordance with the present disclosure, user-data communications corresponding to a user-generated message may be queued and handled by a virtual assistant, thereby improving user experiences. The series of inquires may be dynamic in that subsequent inquires presented to the sender may be dependent on answers provided to previous inquiries. As described herein, a machine learning-based algorithm may generate and modify the dynamic series of inquiries to promptly and efficiently address data communications.

Prior to and/or commensurate with the initiation of the dynamic series of inquiries, the user-data communication corresponding to a user-generated message, may be placed in a queue. The user-data communications may be addressed to a client among a plurality of remotely-situated client entities. As described herein, each of the plurality of remotely-situated client entities may be configured and arranged to interface with a data communications server providing data communications services on a subscription basis. Upon receipt of the user-data communication, a virtual assistant session may be initiated via the data communications server, while a relative position of the user-data communication is maintained in the queue. As used herein, a virtual assistant session refers to or includes the dynamic series of inquiries provided to, and associated responses received from, a sender of a data communication (such as a customer of a client entity). During the virtual assistant session, a dynamic series of inquiries may be presented to address the user-data communication while the relative position of the user-data communication is maintained in the queue. The dynamic series of inquiries may be modified based on responses received during the virtual assistant session, to identify an issue or topic associated with the user-data communication. The user-data communication may be terminated, and the user-data communication may be removed from the queue, in response to an indication that the user-data communication was addressed during the virtual assistant session. Additionally and/or alternatively, the user-data communication may be routed via the data communications server based on the relative position of the user-data communication in the queue, in response to an indication that the user-data communication was not addressed during the virtual assistant session.

As an illustration, a customer, Jane Doe, of a client entity, Acme Company, may contact Acme Company with a question about a particular product purchased from Acme Company. In this illustration, Acme Company is a client of a data communications provider, which provides data communications services on a subscription basis. Upon receipt of the call from Jane Doe, a data-communications server may place her call in a queue to be addressed by the next available representative, such as a live customer service representative employed and/or provided by Acme Company. While Jane Doe's call is in the queue, a virtual assistant may be provided to Jane Doe via a voice prompt and/or a visual display on her communications device, such as her mobile phone. As used herein, a virtual assistant refers to or includes instructions stored in a non-transitory machine readable medium and executable by a processing resource, which when executed by the processing resource cause the processing resource to present a dynamic series of inquiries to the sender of the data communication in order to identify a topic, problem, and/or issue of the data communication. A dynamic series of inquiries refers to or includes an ordered list of questions and/or prompts provided to the sender of the data communication in order to identify the topic, problem, and/or issue of the data communication.

In this illustration, the virtual assistant provides Jane Doe with a series of questions to identify the nature of her call to Acme Company. Jane Doe may respond to the inquiries by voice, by text, or by a combination of voice and text responses. Based on her responses, the virtual assistant, via the data-communications server, modifies the subsequent questions provided to Jane Doe in order to further identify the nature of her call and/or to identify an answer or solution to her call. In the event that, through the virtual assistant, Jane Doe's question about the product is answered, an indication to the virtual assistant that her question was fully addressed by the virtual assistant terminates the call with Jane, and her call is removed from the queue. Conversely, in the event that Jane Doe's question is not answered through the virtual assistant, her call will remain in the queue and her call can be routed to the next available agent in a manner specified by Acme Company, and based on the information gathered by the virtual assistant.

In various example embodiments, a type of the user-data communication may be identified upon receipt, and the virtual assistant may be initiated (e.g., launched) upon receipt of the user-data communication. For instance, in embodiments where the user-data communication is a voice call, the call may be immediately placed in the queue upon receipt, and the virtual assistant session may be initiated while the position in the queue is maintained. As another illustration, in embodiments where the user-data communication is a text message or chat message, the communication may be placed in the queue upon receipt, and the virtual assistant session may be initiated while the position of the text/chat message is maintained in the queue.

The management circuit can be a module associated with a client-specific database and/or a plurality of client-specific databases, and configured and arranged to correlate identifiable aspects of user-data communications with a particular issue or topic. As described herein, a client-specific database may be maintained via the data communications server, and may store information which correlates keywords or tones identified in the user-data communication with a particular issue or topic associated with the client to which the user-data communication was directed. As such, a keyword or a tone may be identified from the user-data communication and compared to the client-specific database. The dynamic series of inquires may then be generated based on the comparison of the identified keyword or tone to the client-specific database. Similarly, the client-specific database and the dynamic series of inquires may be modified responsive to user feedback indicating a relevance of the dynamic series of inquiries to the issue or topic of the user-data communication. In such a manner, a machine learning-based algorithm may generate and modify the dynamic series of inquiries.

In additional example embodiments, the user-data communication is a non-voice communication. In such embodiments, the client-specific database may be maintained via the data communications server, which correlates keywords or phrases identified in the user-data communication with a particular issue or topic associated with the client to which the user-data communication was directed. A keyword or a phrase may be identified from the user-data communication and compared to the client-specific database. The dynamic series of inquires may be generated based on the comparison of the identified keyword or phrase to the client-specific database.

Depending on the type of user-data communication received, the format of the virtual assistant session may differ. For instance, if the user-data communication is a voice call, then the virtual assistant session may be initiated by voice prompt. As another illustration, if the user-data communication is a text message, the virtual assistant session may be initiated by text message. As yet another illustration, if the user-data communication is an email or other text-based communication, the virtual assistant session may be initiated by email, chat, or other text-based communication. The virtual assistant session may be provided as a display on a graphical user interface and/or a voice prompt, based on the type of the user-data communication. In some example embodiments, the virtual assistant session may be initiated in a format different than the format of the user-data communication, and/or in multiple formats.

In various embodiments, a transcript of the dynamic series of inquiries and responses provided during the virtual assistant session may be generated. A transcript may be useful when the questions and responses presented during the virtual assistant session would be helpful for review at a subsequent time. For instance, the user-data communication may be routed to an agent of the client based on the relative position of the user-data communication in the queue and in response to the indication that the user-data communication was not addressed during the virtual assistant session. The transcript of the virtual assistant session may then be provided to the agent in response to the routing.

In another particular example embodiment, user-data communications corresponding to a user-generated message may be queued and handled by a virtual assistant, facilitated by an apparatus comprising a client-specific database and a client-specific communications server. The client-specific database may be configured and arranged to correlate identifiable aspects of user-data communications with a particular issue or topic associated with a client entity among a plurality of remotely-situated client entities. As described herein, each of the plurality of remotely-situated client entities are configured and arranged to provide data communications services for a plurality of end-users having respective data communication devices including circuitry to facilitate the data communications services. The client-specific communications server may be configured and arranged to interface with the client-specific database and a data-center communications server providing the data communications services to the plurality of remotely-situated client entities on a subscription basis.

The client-specific communications server may queue data communications for the client entity, by placing in a queue, a user-data communication corresponding to a user-generated message, the user-data communication addressed to the client entity. A virtual assistant session may be initiated while a relative position of the user-data communication is maintained in the queue, and a dynamic series of inquiries may be retrieved from the client-specific database. The dynamic series of inquiries may address the user-data communication while the relative position of the user-data communication is maintained in the queue. As described herein, the user-data communication may be terminated, and the user-data communication may be removed from the queue in response to an indication that the user-data communication was addressed during the virtual assistant session. Similarly, the user-data communication may be routed based on instructions in the client-specific database, based on the relative position of the user-data communication in the queue, and in response to an indication that the user-data communication was not addressed during the virtual assistant session.

In various example embodiments, the identifiable aspects of the user-data communications include at least one of a keyword, a tone, and a phrase. In such embodiments, the client-specific communications server is configured and arranged to queue data communications for the client entity, by receiving from an end-user from which the user-data communication originated, feedback indicating an extent to which the dynamic series of inquiries correspond with the issue or topic of the user-data communication. The client-specific database may then be updated for the client entity, in accordance with the received feedback.

At least one machine learning-based algorithm may be used to queue data communications in the data communications network. For instance, the data-center communications server may queue data communications for each respective client entity, by providing to each respective client entity, an option to specify a plurality of identifiable aspects that may be identified from user-data communications directed to the respective client entity, and the issue or topic correlated to each respective identifiable aspect. As an illustration, a particular client entity may specify project names and particular questions to be asked by the virtual assistant for particular projects. As another illustration, a particular client entity may specify key words or phrases that are associated with a known technological problem faced by customers, and a series of questions to be asked by the virtual assistant based on the known technological problem. Feedback from the customer and/or the client entity may improve the virtual assistant services, by implementing machine learning and/or artificial intelligence to further correlate key words and/or phrases and the like with particular issues and/or topics particular to the client entity.

As described herein, the data-center communications server may retrieve from data sources associated with the respective client entity, client-specific contextual information, including information pertaining to client relationships, particular projects of the respective client entity, or identified technological issues of the respective client entity. Such client-specific contextual information may supplement the client-specific database with the client-specific contextual information such that improved queuing may be provided by the virtual assistant. To further improve the queuing provided by the virtual assistant, the data-center communications server may provide a graphical user interface to the end-users of each respective client entity, including selectable options to view, add, remove, and/or update the correlations between the identifiable aspects of the user-data communications and particular issues or topics associated with the respective client entity.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

According to certain embodiments, a data communications system may be configured to allow a client-specific control engine to dynamically modify and control the communication flow and processing at different levels within the system, including (re)routing of incoming communications.

Rules of various complexity can be used for routing incoming communications, whether to one or more receptionists, directly to extensions, to voicemail, or for other communication routing purposes. Similarly, rules of various complexity can be used to control devices associated with particular client entities. The logic used for the control of the networked devices can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating the data communication system, particularly in situations where there are many thousands of extension rules can be a difficult proposition.

The data communication system described herein provides inbound and outbound communication routing for a data communications system. The data communications system may be configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity).

The client-specific sets of control data may define a manner in which various networked devices (e.g., endpoint devices) are controlled via the data communications system. For example, various endpoint devices may be capable of voice interaction, music playback, making to-do lists, setting alarms, streaming podcasts, playing audiobooks, and providing weather, traffic, and other real time information, such as news. In such examples, the client-specific sets of control data may specify how frequently the networked devices collect data and how frequently data is communicated between various networked devices.

Similarly, client-specific sets of control data may define a manner in which endpoint devices may be controlled and/or monitored by the data communications system. For example, networked devices (e.g., IoT) may include devices for home automation (also known as smart home devices) that control automation of lighting, heating (like a smart thermostat), ventilation, air conditioning (HVAC) systems, and appliances such as washer/dryers, robotic vacuums, air purifiers, ovens, or refrigerators/freezers. The client-specific sets of control data may define a manner in which such networked devices communicate with the data communications system, a manner in which they communicate with one another, various parameters for remote monitoring of the networked devices, and the like. In some examples, the client-specific sets of control data may specify particular individuals and/or groups of individuals associated with a client entity that may access and/or control the networked devices associated with the client entity, using the data communications system.

Figure 1:
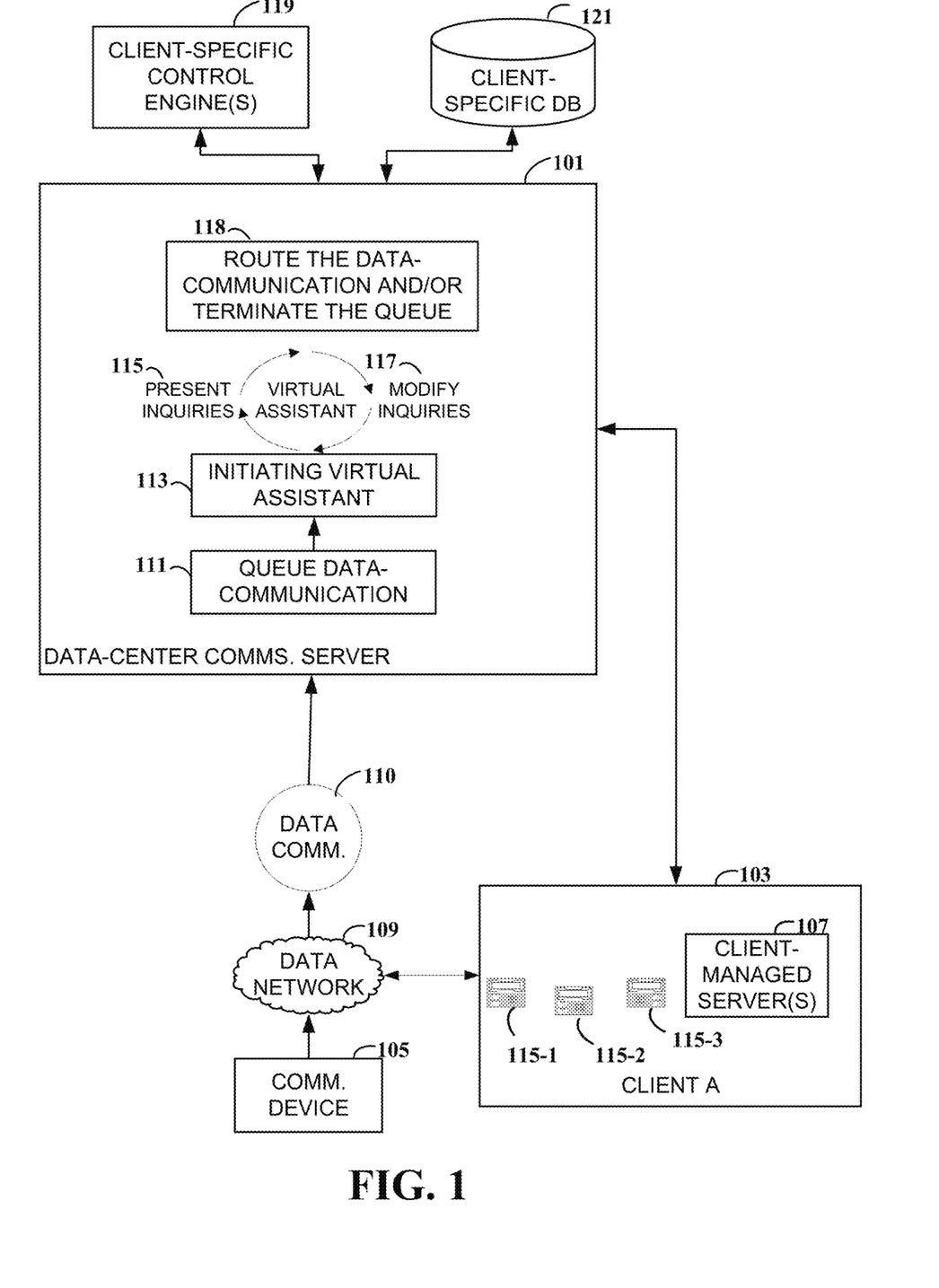
FIG. 1 illustrates a block diagram of an example system for queuing data communications using a virtual assistant, consistent with the present disclosure.

Turning now to the figures, FIG. 1 illustrates a block diagram of an example system for monitoring user-data communications corresponding to a user-generated message, consistent with the present disclosure. For example, a data communications device 105, such as may be used by a customer of a client entity, may send a user-data communication to a client. For instance, customer Jeff Smith may call ABC Company with a question about a product that he purchased. The phone call placed by Jeff Smith (e.g., the user-data communication) may originate from Jeff Smith's device 105. Communications device 105 includes circuitry configured and arranged to facilitate data communications with client A (e.g., ABC Company in the above illustration), as well as a data-center communications server 101. The user-data communication (e.g., Jeff Smith's phone call) may be communicated to the client (e.g., client A 103), via a data network 109. The data network may be communicatively coupled to a data-center communications server 101, such as may be provided by a data communications server providing data communications services on a subscription basis.

As described herein, the user-data communication may be routed to the client entity in a manner specified by the client entity. For instance, upon receipt by the data-center communications server 101, the user-data communication 110 corresponding to a user-generated message may be placed in a queue, at 111. Also upon receipt of the user-data communication 110 by the data-center communications server 101, a virtual assistant may be initiated, at 113. The virtual assistant session may be initiated while a relative position of the user-data communication is maintained in the queue, such that the sender of the data communication does not lose his or her position within the queue while utilizing the virtual assistant.

Once the customer begins recording/typing/generating the data communication, the data-center communications server 101 may analyze and route the user-data communications. The data-center communications server may capture data communication in a number of ways, and interact with the sender in a number of ways. For instance, Jeff Smith may contact a client entity by voice and interact with the virtual assistant by voice, in which case a transcript of the voice call and the virtual assistant session may be generated. Although various illustrations provided herein include the use of voice calls, it is noted that in various example embodiments, the user-data communication corresponds to a user-generated audible message or a non-voice user-generated message. For instance, the user-generated audible message includes a voice call. As another illustration, the non-voice user-generated message includes an email, a text message, and/or a chat session. Examples are not so limited, however, and additional and/or different types of voice and/or non-voice user-generated messages may be generated.

During the virtual assistant session, the sending party may be presented with a dynamic series of inquiries at 115 to address the user-data communication while the relative position of the user-data communication is maintained in the queue. Prior to initiating the virtual assistant, a type of the user-data communication may be identified, and the dynamic series of inquiries may be presented to the sender in a same format of the user-data communication. For instance, if the user-data communication 110 was a chat message, the virtual assistant may be presented to the sender in the form of a new chat message. As another illustration, if the user-data communication 110 was a text message, the virtual assistant may be presented to the sender in the form of a new text message.

In yet further embodiments, the format of the virtual assistant may be independent of the format of the user-data communication. For instance, if the user-data communication 110 is an email message the virtual assistant may be provided by chat message and/or text message. As another illustration, if the user-data communication 110 was a chat message, the virtual assistant may be provided by voice.

The dynamic series of inquiries may be modified at 117, based on responses received during the virtual assistant during the virtual assistant session, and to identify an issue or topic associated with the user-data communication. For instance, the data-center communications server 101, may maintain a client-specific database 121 that correlates keywords or tones with a particular issue or topic associated with the client to which the user-data communication was directed. The data-center communications server 101 may identify a keyword or a tone from the user-data communication 110 and compare the identified keyword or tone to the client-specific database 121. The data-center communications server 101 may then generate and/or modify the dynamic series of inquires based on the comparison of the identified keyword or tone to the client-specific database. The client-specific database 121 may be supplemented and/or modified, and the dynamic series of inquires may be modified, responsive to user feedback indicating a relevance of the dynamic series of inquiries to the issue or topic of the user-data communication. Based on the identified issue or topic of the user-data communication, the data-center communications server 101 may route the data communication and/or terminate the queue in accordance with instructions stored in client-specific control engines 119.

As an illustration, customer Bob Johnson may initiate a chat session with Zenith Inc. (e.g., client A 103 illustrated in FIG. 1) with a question about his new computer, which he purchased from Zenith Inc. Upon receipt of Bob Johnson's first chat message (e.g., user-data communication 110), Bob's chat message will be placed in a queue to be addressed by a customer service representative. As substantially the same time as the chat message is placed in the queue, a virtual assistant provided by the data-center communications server 101 will be provided to Bob Johnson on the computing device which he used to initiate the chat session. Using the virtual assistant, a series of inquiries are provided to Bob to identify the nature of his chat message. Based on Bob's responses, indicating that he is having issues with his new computer, the inquiries presented to Bob via the virtual assistant will be modified. The modification of the inquiries may be based at least in part, on information stored in the client-specific database 121. The client-specific database may store correlations between keywords and phrases which are particular to Zenith Inc. and Zenith Inc. products, to issues and/or topics identified by Zenith Inc.

Regardless of the format of Bob Johnson's communication to Zenith Inc. (e.g., whether it is a voice call, a text message, and an email message, etc.), the data-center communications server may analyze the contents of the communication received from Bob. For instance, in the example that Bob's communication is a voice call, the data network 109 may direct a voice communication (e.g., data communication 111) to a message recording system capable of generating a voice and/or text transcript of the Bob's call. In the event that Bob's inquiry regarding his new computer is not addressed by the virtual assistant, his communication may be routed to an agent of the client (e.g., Zenith Inc. in the above illustration) based on the relative position of the user-data communication in the queue and in response to the indication that the user-data communication was not addressed during the virtual assistant session. The transcript of the virtual assistant session with Bob Johnson may then be provided to the agent, such that the agent is equipped in a list of inquiries and responses to expedite addressing Bob's questions.

As described herein, the received user-data communication 110 may be directed to a particular client (e.g., client A 103) among a plurality of remotely-situated client entities. Each of the plurality of remotely-situated client entities may be configured and arranged to interface with a data communications server providing data communications services on a subscription basis, and each of the plurality of remotely-situated client entities may be associated with a respective client-managed server 107. As illustrated in FIG. 1, each of the remotely-situated client entities may be associated with a plurality of end-user communications devices 115-1, 115-2, 115-3, which include circuitry configured and arranged to facilitate transmission of the data communications services provided by the data-center communications server 101.

As described herein, the data-center communications server 101 and/or the client managed server 107 may facilitate the routing of voice communications associated with a particular client entity (in the example of FIG. 1, client A 103). For instance, the data-center communications server 101 and/or the client managed server 107 may route (at 118) the user-data communication 110 based on the relative position of the user-data communication 110 in the queue and in response to an indication that the user-data communication was not addressed during the virtual assistant session. In some embodiments, the client managed server 107 may present the inquiries at 115 and 117. In other embodiments, the data-center communications server 101 may present the inquiries at 115 and 117. In yet further embodiments, both the client managed server 107 and the data-center communications server 101 may present the inquiries at 115 and 117 for a redundant system.

In some example embodiments, the data-center communications server 101 and/or the client managed server 107 may generate and/or modify the dynamic series of inquiries presented by the virtual assistant by identifying various speech characteristic parameters in the user-data communication 110. As used herein, the speech characteristic parameters refer to or include factors that assist in identifying a sentiment, topic, and/or issue of a particular communication. Speech characteristic parameters may include key words, phrases, a combination of key words and phrases, and/or measurable audio values including a wavelength or velocity of the recorded message, and an amplitude of the recorded message. Particular topics, key words, phrases, or combinations thereof may be associated with a particular project for one client entity, and be of little or no importance for another client entity. Accordingly, the data-center communications server 101 may be communicatively coupled to a client-specific database 121, and/or a plurality of client-specific databases. The client-specific database 121 may store correlations for each respective client entity served by the data communications provider, associating key words, phrases, combinations of key words and phrases, and measurable audio values with different respective issues or topics pertinent to the client entity. Similarly, the client-specific database 121 may store a list of inquiries for each respective client entity served by the data communications provider, associating key words, phrases, and combinations of key words and phrases, with different respective issues and/or topics.

The manner in which each respective communication is handled may be specified in a client-specific database 121. The database may also include customer relationship management data, and context information associated with particular clients among the plurality of remotely-situated client entities, as discussed further herein. The client-specific database 121 may be configured and arranged to correlate identifiable aspects of user-data communications (e.g., user-data communication 110) with a particular issue or topic associated with a client entity among a plurality of remotely-situated client entities.

Figure 2:
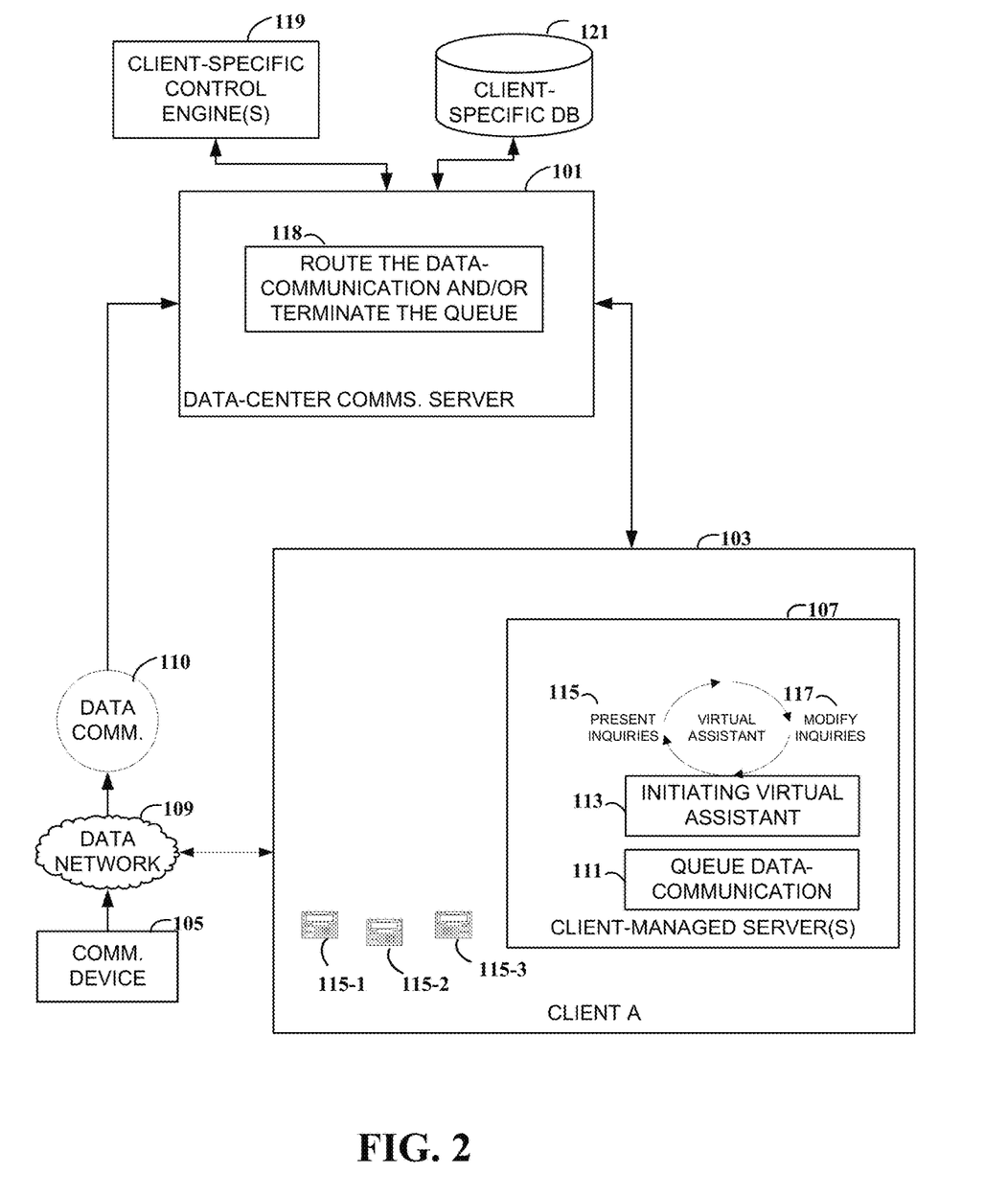
FIG. 2 illustrates a block diagram of an additional example system for monitoring user-data communications corresponding to a user-generated message, consistent with the present disclosure.

FIG. 2 illustrates a block diagram of an additional example system for monitoring user-data communications corresponding to a user-generated message, consistent with the present disclosure. As illustrated in FIG. 2, a client-specific communications server (e.g., client-managed server 107) may be configured and arranged to interface with the client-specific database 121 and the data-center communications server 101. In various embodiments, the client-specific communications server 107 is configured and arranged to queue data communications for the client entity (e.g., client A). For instance, the client-specific communications server 107 may place in a queue, a user-data communication corresponding to a user-generated message, the user-data communication addressed to the client entity. The client-specific communications server 107 may then initiate a virtual assistant session while a relative position of the user-data communication is maintained in the queue. The dynamic series of inquiries may be retrieved from the client-specific database 121 to address the user-data communication while the relative position of the user-data communication is maintained in the queue.

The client-specific communications server 107 may communicate with the data-center communications server 101 to facilitate routing of the communication, if necessary, responsive to the virtual assistant session. For instance, routing of data communications may be facilitated by the data-center communications server 101. In response to an indication that the user-data communication was addressed during the virtual assistant session, the client-specific communications server 107 may terminate the user-data communication, remove the user-data communication from the queue, and communicate to the data-center communications server 101 that the previously queued data communication does not need to be routed. Additionally and/or alternatively, in response to an indication that the user-data communication was not addressed during the virtual assistant session, the client-specific communications server 107 may communicate to the data-center communications server 101 that the user-data communication should be routed. In response, the data-center communications server 101 may route the user-data communication at 118, based on instructions in the client-specific database, and based on the relative position of the user-data communication in the queue. As discussed with regards to FIG. 1, the data-communication may be routed may route the data communication and/or terminate the queue in accordance with instructions stored in client-specific control engines 119.

As described herein, the client-specific database 121 may be configured and arranged to correlate identifiable aspects of user-data communications with a particular issue or topic associated with a client entity. In various example embodiments, the identifiable aspects of the user-data communications include at least one of a keyword, a tone, and a phrase. Moreover, machine learning may be utilized to improve the correlation between the identifiable aspects and a particular issue or tone. For instance, the client-specific communications server may receive from an end-user from which the user-data communication originated (e.g., Bob Johnson in the previous illustration), feedback indicating an extent to which the dynamic series of inquiries correspond with the issue or topic of the user-data communication. The client-specific database 121 may subsequently be updated in accordance with the feedback received.

In various example embodiments, a plurality of client entities may be serviced by the data-center communications server 101. In such embodiments, each respective client entity may specify identifiable aspects of data communications that are associated with particular issues or topics pertinent to the client entity. Similarly, the client entity (e.g., 103 in FIGS. 1 and 2) may include a plurality of branch locations, and the client-specific communications server 107 may be configured and arranged to queue data communications for the client entity by creating a different set of inquiries for each respective branch location correlating identifiable aspects of user-data communications with particular issues or topics pertinent to the respective branch location, and dynamically updating the set of inquiries for the respective branch locations based on the received feedback. For instance, if client A 103 includes a branch office in San Antonio, Tex. as well as a branch office in Bismarck, N. Dak., the client-specific communications server 107 (or the data-center communications server 101 in the example embodiment illustrated in FIG. 1) may create one set of inquiries particular to the San Antonio office and a different set of inquiries particular to the Bismarck office. Machine learning may be implemented for each respective branch office and collectively for client A, such that a larger pool of data is used to generate the dynamic inquiries, yet local dialect, communication styles, and/or projects may also be considered when generating the dynamic inquiries.

Figure 3:
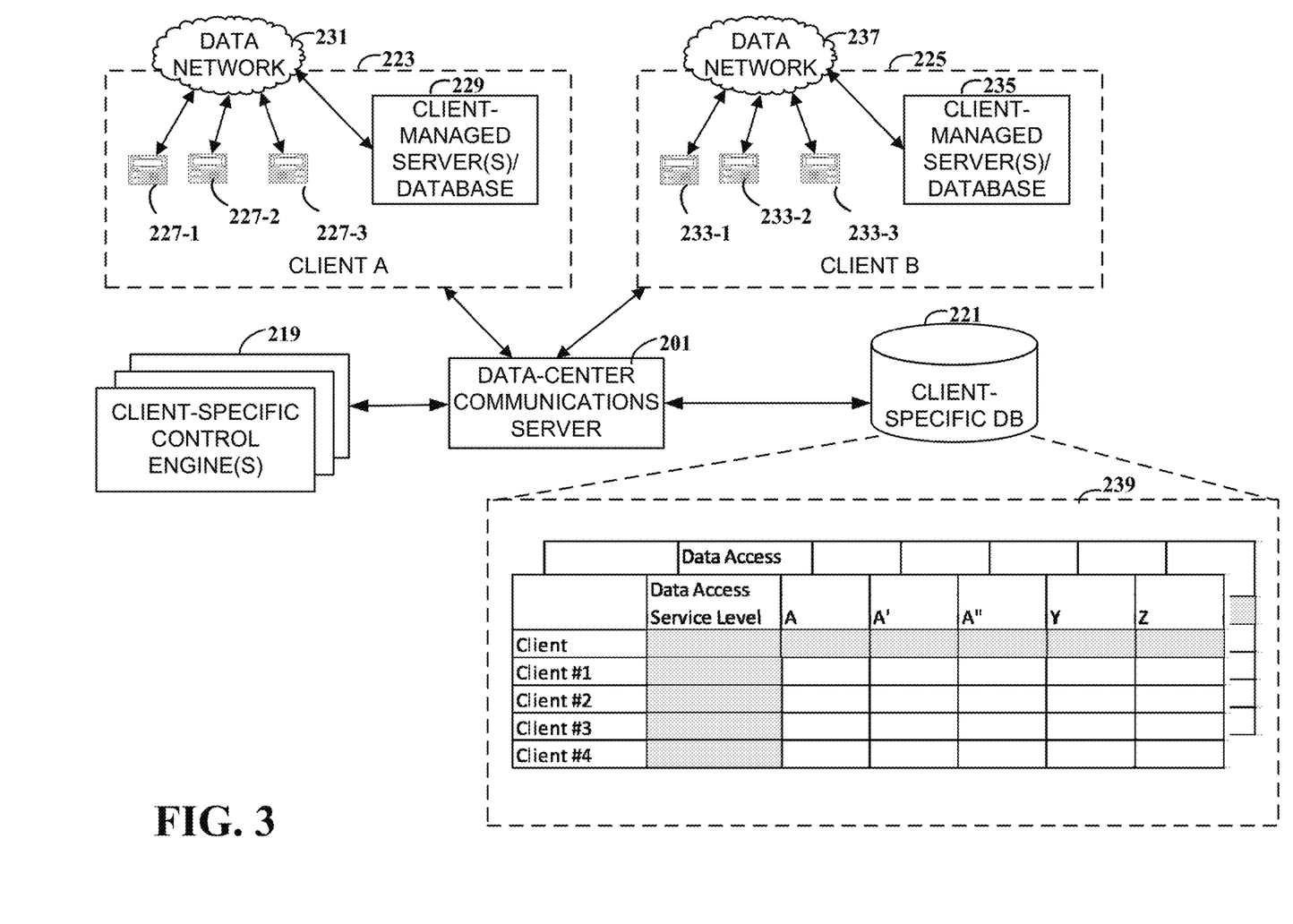
FIG. 3 illustrates a block diagram of an example data communications system for queuing data communications using a virtual assistant, consistent with the present disclosure.

FIG. 3 illustrates a block diagram of an example data communications system for client-specific data communications monitoring, consistent with the present disclosure. The system includes a data-center communications server 201 configured to provide data communications for a plurality of endpoint devices 227-1. 227-2, 227-3, 233-1, 233-2, 233-3, connected in one or more data networks 231 and 237. The endpoint devices may include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data communications server. Registered devices for each client account may be listed in a respective account settings file (not shown) stored by the data-center communications server 201. In this example, endpoint devices 227-1, 227-2, and 227-3 are associated with an account 223 for a first client A and endpoint devices 233-1, 233-2, and 233-3 are associated with an account 225 for a second client B.

The system includes one or more processing circuits configured to implement client-specific control engines 219, which are configured to adjust the data communications provided for each client account according to a respective set of control directives. For instance, the client-specific control engines 219 may adjust a manner in which endpoint devices 227-1, 227-2, and 227-3 are controlled, and/or a manner of routing of a data communications for a client account, by generating client-specific sets of control data to the data-center communications server 201. For example, the client-specific control engines 219 may generate client-specific sets of control data by processing the respective set of control directives for the account in response to communication event data or other data prompts received from the data-center communications server 201.

As previously described, client-specific control engines 219 may be used to facilitate control of endpoint devices associated with a client device. The control of the endpoint devices may be associated with a variety of virtual office features including, for example, data communications services such as VoIP calls, audio and/or video conferencing, IPBX exchange servers, packet switching, and traffic management as well as non-data communications services including, but not limited to, website hosting, remote data storage, remote computing services, virtual computing environments. One or more of such virtual office features may be provided, for example, by a cloud computing network having one or more servers configurable to provide a data communications system for a plurality of clients.

As described herein, a client-specific database, provided by the client itself (illustrated as 229 and 235 in FIG. 3) and/or by the data-center communications server (illustrated as 221 in FIG. 3) may be configured and arranged to correlate identifiable aspects of user-data communications with a particular issue or topic associated with a client entity among a plurality of remotely-situated client entities. Additionally, a data-center communications server 201 may be configured and arranged to interface with the plurality of remotely-situated client entities 223 and 225, and to provide the data communications services to the plurality of remotely-situated client entities on a subscription basis.

The data-center communications server 201 may queue data communications for each respective client entity, by placing in a queue, a user-data communication corresponding to a user-generated message. As described herein, the user-data communications may be addressed to a particular client among the plurality of remotely-situated client entities. For instance, a data communication directed for client A via communication device 227-1 may be placed in a queue for client A. Additional queues may be maintained for different client entities. For instance, a data communication directed for client B via communication device 233-1 may be placed in a queue for client B, separate from client A. The data-center communications server 201 may initiate a virtual assistant session and retrieve from the client-specific database 221, a dynamic series of inquiries to address the user-data communication while the relative position of the user-data communication is maintained in the queue. As described herein, the dynamic series of inquiries may be modified based on identifiable aspects of the user-data communication and responses received during the virtual assistant session, to identify an issue or topic associated with the user-data communication. Similarly, the data-center communications server 201 may terminate the user-data communication and remove the user-data communication from the queue in response to an indication that the user-data communication was addressed during the virtual assistant session. Additionally and/or alternatively, the data-center communications server 201 may route the user-data communication based on instructions in the client-specific database, based on the relative position of the user-data communication in the queue, and in response to an indication that the user-data communication was not addressed during the virtual assistant session.

In various example embodiments, the identifiable aspects of the user-data communications include at least one of a keyword, a tone, and a phrase. In such embodiments, the data-center communications server 201 is configured and arranged to queue data communications for each respective client entity by identifying at least one keyword, tone, or phrase in the user-data communication, and correlating, using the client-specific database, at least one issue or topic with the user-data communication based on the identified keyword, tone, or phrase. The dynamic series of inquiries may then be generated for the user-data communication, based on the correlated issue or topic. In various embodiments, the data-center communications server may receive from an end-user from which the user-data communication originated, feedback indicating an extent to which the dynamic series of inquiries correspond with the issue or topic of the user-data communication. In such embodiments, the data-center communications server 201 may update the client-specific database 221 for the associated client entity, in accordance with the received feedback. To further facilitate machine learning and improve the accuracy of the virtual assistant, the data-center communications server 201 may provide to each respective client entity, an option to specify a plurality of identifiable aspects that may be identified from user-data communications directed to the respective client entity, and the issue or topic correlated to each respective identifiable aspect.

As described herein, the virtual assistant may be provided in a number of different ways. For instance, the data-center communications server 201 may provide to a data communication device of an end-user from which the user-data communication has originated, the virtual assistant session as a display on a graphical user interface of the data communication device. Additionally and/or alternatively, the virtual assistant may be provided by voice through the data communication device.

In various example embodiments, the data-center communications server 201 may generate a transcript of the dynamic series of inquiries and responses provided during the virtual assistant session. The user-data communication may be routed to an agent of the client based on the relative position of the user-data communication in the queue and in response to the indication that the user-data communication was not addressed during the virtual assistant session. The transcript of the virtual assistant session may then be provided to the agent in response to the routing.

As previously described, client-specific control engines 219 may be used to facilitate control of endpoint devices associated with a client device. The control of the endpoint devices may be associated with a variety of virtual office features including, for example, data communications services such as VoIP calls, audio and/or video conferencing, IPBX exchange servers, packet switching, and traffic management as well as non-data communications services including, but not limited to, website hosting, remote data storage, remote computing services, virtual computing environments. One or more of such virtual office features may be provided, for example, by a cloud computing network having one or more servers configurable to provide a data communications system for a plurality of clients.

Each respective client entity may have a client-managed server and/or database. For instance, client A 223 may be associated with a client managed server or database 229, whereas client B 225 may be associated with a client managed server or database 235. The client-managed server may facilitate the routing of data communications between the respective endpoint devices and the data-center communications server. Similarly, the client-managed servers may, in some example embodiments, analyze the keywords, phrases and/or tones of data communications sent to and/or received by the respective endpoint devices, as discussed herein. In some example embodiments, each respective client entity may have a database storing correlations between keywords, phrases, and/or tones and particular issues or topics specific to the particular client entity.

Additionally and/or alternatively, the data-center communications server 201 may be communicatively coupled with a client-specific database 221, storing service level subscriptions 239 for each of a plurality of client entities. For example, the data communications service provider may provide a plurality of different service levels for the clients. Each disparate service level may provide additional services and/or information to the client entity, relative to past communications handled and subsequent communications to be handled by the service provider. For example, Client A 223 and Client B 225 may be associated with a home improvement store and an adhesives manufacturer, respectively. Service level A, which may be offered to both Client A and Client B, may be associated with routing communications for Client A and Client B, and also providing information to the clients regarding customer purchase data. The purchase data may include information about how many products were purchased, when they were purchased, which products were associated with problems and/or an increased number of customer complaints, and the like. Similarly, a second service level (e.g., service level A') may include the services of the first service level (e.g., service level A) but also information on venue and regional demographics. For instance, Service level A', which may be offered to both Client A and Client B, may be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") may include the services of service level A' but also information on venue and relative pricing grouping. For instance, service level A", which may be offered to both Client A and Client B, may be associated with routing communications for Client A and Client B, providing information to the clients regarding customer purchase data, providing information about demographic populations, and information regarding relative prices which each demographic population is willing to spend. Additional service levels (e.g., service level Y and service level Z illustrated in FIG. 2) may be specified. Each respective client entity (e.g., client #1 through client #4) may have a specified level of data service access provided by the data-center communications server 201.

Figure 4:
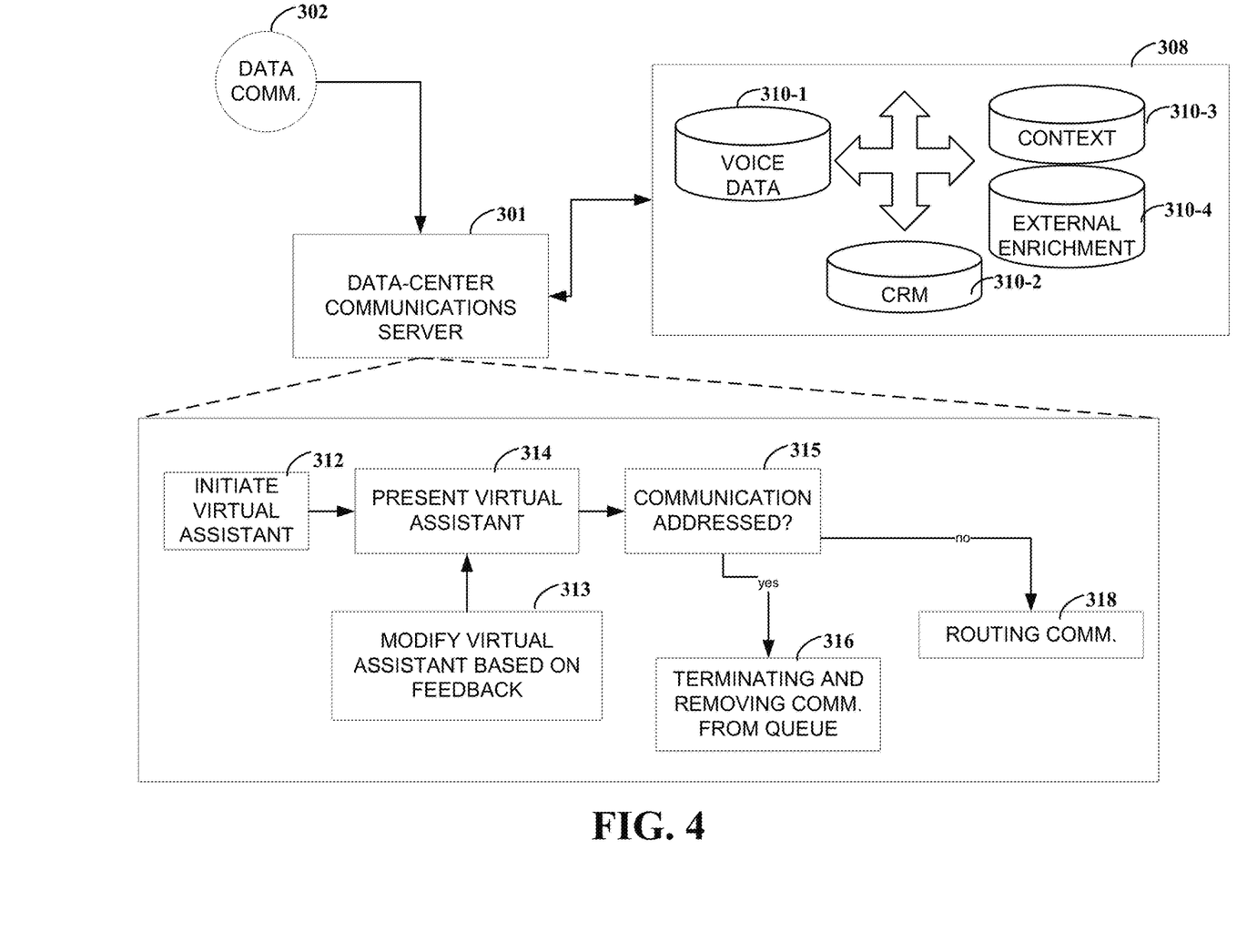
FIG. 4 illustrates a flow diagram illustrating an example method for queuing data communications using a virtual assistant, consistent with embodiments of the present disclosure.

FIG. 4 illustrates a flow diagram illustrating an example method for queuing data communications using a virtual assistant, consistent with embodiments of the present disclosure. In connection with these specifically-illustrated examples, data communications endpoint devices connected in a data network are configured to place and receive data communications between other data communications endpoint devices, and/or between non-data communications endpoint devices, as discussed with regards to FIGS. 1, 2 and 3. Non-data communications endpoint devices may include, for example, plain old telephone service (POTS) telephones and cellular-capable devices, which might also be data communications capable (e.g., smart phones with appropriate data communications software applications). The various endpoint devices include circuitry that is specially configured to provide communications functions that include interfacing with the appropriate circuitry of the communication service provider used by the corresponding endpoint device. In many contexts, a data communications endpoint device is a data communications-capable telephone commonly referred to as IP phones. The data communications endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communications system can be provided by one or more data-center communications servers 301 within a cloud services system (e.g., configured to provide virtual office features to customers of the data communications provider). In particular example embodiments, the data-center communications servers 301 can be located within the cloud services system (e.g., data network 109 illustrated in FIG. 1). The cloud services system also includes one or more provider hosted client-specific control engines, configured as described with reference to 119 in FIG. 1. A client-specific control engine may also be implemented locally by a client (e.g., by a client-managed server as illustrated in FIG. 1 at reference numeral 107, and in FIG. 2 as reference numerals 229 and 235). In some embodiments, data centers can be part of a cloud-based system where the hardware providing the cloud services is located in a number of different data centers with different physical locations. Consistent with embodiments, the cloud services can include SIP servers, media servers, and servers providing other services to both data communications endpoint devices and the users of the data communications endpoint devices. In some instances, the various servers, including the data-center communications server(s), can have their functions spread across different physical and logical components. For instance, a cloud-based solution can implement virtual servers that can share common hardware and can be migrated between different underlying hardware. Moreover, separate servers or modules (whether internal to each such server or each such server corresponding to the module(s)) can be configured to work together so that they collectively function as a single unified server.

A particular example of a data-center communications server uses session initiation protocol (SIP) to handle various communication functions (e.g., communication setup and tear down); however, the various embodiments discussed herein are not necessarily limited thereto. Consistent with the above and other embodiments disclosed herein, the data communications servers can be configured to establish a portion of the communication from the data communications endpoint devices to another data communications endpoint device, or to a gateway.

At 302, the method includes receiving a data communication from an endpoint device. In various example embodiments, the transmission of the data communication may be facilitated via a computing server configured and arranged to interface with a plurality of remotely-situated client entities to provide data communications services on a subscription basis. Each respective client entity may be associated with a different respective client-server, as described herein. As such, the transmission and receipt of such data communications may be facilitated by a processing circuit, such as the respective client-server, communicatively coupled to the computing server and configured and arranged to provide data communications services to the various endpoint devices of the client entity.

Upon receipt of a respective data communication 302, the data-center communications server 301 may place the data communication in a queue and initiate a virtual assistant at 312. As described herein, the virtual assistant may be presented to the sender of the data communication at 314, in a format that is consistent with or different than the format in which the data communication 302 was sent. Using machine learning, and based on responses received during the virtual assistant during the virtual assistant session, the dynamic series of inquiries presented by the virtual assistant may be modified at 313. Next, a determination may be made as to whether the user-data communication was addressed at 315. In response to an indication that the user-data communication was addressed during the virtual assistant session, the user-data communication may be terminated and removed from the queue at 316. Similarly, in response to an indication that the user-data communication was not addressed during the virtual assistant session, the user-data communication may be routed at 318 and as discussed with regards to FIGS. 1, 2, and 3.

In various embodiments, the dynamic series of inquiries may be generated at least in part based on information retrieved from a plurality of sources 308. For instance, the data-center communications server 301 may retrieve from a client-specific database (such as 221 illustrated in FIG. 3), a set of rules associating the voice communication with at least one communication handling process. The data-center communications server 301 may also access customer relationship management (CRM) data from a CRM server 310-2, including information about the particular client entity, services and/or products purchased by the particular client entity, previous communications with the particular client entity, and names and contact information of individuals associated with the client entity. Additionally and/or alternatively, the data-center communications server 301 may access a voice data server 310-1, which includes audio recordings from previous communications with the particular client entity, transcripts from previous communications, and/or information about such previous communications with the particular client entity. The CRM server 310-2 and voice data server 310-1 may further be in communication with a context server 310-3 and an external enrichment server 310-4. The external enrichment server 310-4 may include information regarding communications services accessed by the plurality of remotely-situated client entities, the communications services including an email system and a text-based chat system, among others. The context server 310-3 may identify a context of the voice communication based on the CRM data, information in the email system, or information in the text-based chat system. The data-center communications server 301 may further be in communication with each of the voice data server 310-1, CRM server 310-2, context server 310-3, and external enrichment server 310-4.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data communications) endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. In a communications system involving a data communications server and a client-managed server, a method for queuing data communications, the method comprising:
    the communications system placing in a queue, a user-data communication corresponding to a user-generated message in response to an indication that the user-data communication is addressed to a client among a plurality of remotely-situated client entities, each of the plurality of remotely-situated client entities respectively configured and arranged to interface with the data communications server providing data communications services on a subscription basis and gathering client-specific contextual information while the data communications services are being provided through use of respective data communication devices including circuitry to facilitate the data communications services, wherein the respective data communication devices are operated by or on behalf of one or more end-users of each respective one of the plurality of remotely-situated client entities;
    the data communications server operating to:
        establish a virtual assistant session while a relative position of the user-data communication is maintained in the queue;
        present during the virtual assistant session, a dynamic series of inquiries to address the user-data communication while the relative position of the user-data communication is maintained in the queue;
        modify the dynamic series of inquiries based on responses received during the virtual assistant during the virtual assistant session and based on the gathered client-specific contextual information, to identify an issue or topic associated with the user-data communication and with the client-specific contextual information;
        maintain, via the data communications server, a client-specific database that correlates keywords and tones identified in the user-data communication with a particular issue or topic associated with the client to which the user-data communication was directed and in response, that updates the gathered client-specific contextual information;
        identify at least one of a keyword or a tone from the user-data communication and comparing the identified keyword or tone to information stored in the client-specific database;
        terminate the user-data communication and removing the user-data communication from the queue in response to an indication that the user-data communication was addressed during the virtual assistant session;
        route the user-data communication via the data communications server based on the relative position of the user-data communication in the queue and based on the information gathered by the virtual assistant and in response to an indication that the user-data communication was not addressed during the virtual assistant session; and
        provide a transcript of the virtual assistant session to an agent in response to the routing;
    wherein each of the respective client entities is to specify a plurality of identifiable aspects that may be identified from user-data communications directed to the respective client entity, and a client-specific issue or topic is correlated to each respective identifiable aspect based on gathering client-specific contextual information.

2. The method of claim 1, further including the data communications server operating to identify upon receipt, a type of the user-data communication.

3. The method of claim 2, wherein the user-data communication is a voice call, the method including the data communications server operating to place the call in the queue immediately upon receipt, and initiating the virtual assistant session while the position in the queue is maintained.

4. The method of claim 1, including the data communications server operating to
    generate the dynamic series of inquires based on the comparison of the identified keyword or tone to the information stored in the client-specific database.

5. The method of claim 1, including the data communications server operating to:
    modify the information stored in the client-specific database and the dynamic series of inquires responsive to user feedback indicating a relevance of the dynamic series of inquiries to the issue or topic of the user-data communication.

6. The method of claim 1, wherein the user-data communication is a non-voice communication.

7. The method of claim 6, including the data communications server operating to generate the dynamic series of inquires based on the comparison of the identified keyword or phrase to information stored in the client-specific database.

8. The method of claim 2, including the data communications server operating to provide the virtual assistant session as a display on a graphical user interface or a voice prompt, based on the type of the user-data communication.

9. The method of claim 2, including the data communications server operating to:
generate the transcript and wherein the transcript includes the dynamic series of inquiries and responses provided during the virtual assistant session.

10. An apparatus, comprising:
a management circuit configured and arranged to correlate identifiable aspects of user-data communications with a particular issue or topic associated with a client entity among a plurality of remotely-situated client entities, each of the plurality of remotely-situated client entities respectively configured and arranged to provide data communications services via respective data communication devices operated by or on behalf of a plurality of end-users, the respective data communication devices including circuitry to facilitate the data communications services; and
a client-specific communications server configured and arranged to interface with the management circuit and a data-center communications server providing the data communications services for or on behalf of the respective end-users of the plurality of remotely-situated client entities on a subscription basis, wherein the client-specific communications server is configured and arranged to queue data communications for the client entity, by:
placing in a queue, a user-data communication corresponding to a user-generated message, the user-data communication addressed to the client entity;
initiating a virtual assistant session while a relative position of the user-data communication is maintained in the queue;
retrieving from the management circuit, a dynamic series of inquiries to address the user-data communication while the relative position of the user-data communication is maintained in the queue, wherein the inquiries are adjusted based on client-specific contextual information gathered to facilitate certain of the data communications services provided to each of the respective clients;
terminating the user-data communication and removing the user-data communication from the queue in response to an indication that the user-data communication was addressed during the virtual assistant session; and
routing the user-data communication based on instructions stored by the management circuit, based on the relative position of the user-data communication in the queue, and in response to an indication that the user-data communication was not addressed during the virtual assistant session;
wherein the client entity includes a plurality of branch locations, and the client-specific communications server is configured and arranged to queue data communications for the client entity, by: creating a different set of inquiries for each respective branch location correlating identifiable aspects of user-data communications with particular issues or topics pertinent to the respective branch location; and dynamically updating the set of inquiries for the respective branch locations based on received feedback, the identifiable aspects including keywords or tones to be compared to a client-specific database associated keywords and tones with different issues or topics.

11. The apparatus of claim 10, wherein the identifiable aspects of the user-data communications include at least one of a keyword, a tone, and a phrase, and the client-specific communications server is configured and arranged to queue data communications for the client entity, by:
receiving from an end-user from which the user-data communication originated, feedback indicating an extent to which the dynamic series of inquiries correspond with the issue or topic of the user-data communication; and
updating the instructions stored by the management circuit for the client entity, in accordance with the received feedback.

12. An apparatus, comprising:
a management circuit configured and arranged to correlate identifiable aspects of user-data communications with a particular issue or topic associated with at least one client entity among a plurality of remotely-situated client entities, each of the plurality of remotely-situated client entities respectively configured and arranged to provide data communications services via respective data communication devices operated by or on behalf of a plurality of end-users, the respective data communication devices including circuitry to facilitate the data communications services; and
a data-center communications server configured and arranged to interface with the plurality of remotely-situated client entities and to provide the data communications services to the plurality of remotely-situated client entities on a subscription basis, wherein the data-center communications server is configured and arranged to queue data communications for each respective client entity, by:
placing in a queue, a user-data communication corresponding to a user-generated message, the user-data communications addressed to a particular client among the plurality of remotely-situated client entities;
initiating a virtual assistant session while a relative position of the user-data communication is maintained in the queue;
retrieving from the management circuit, a dynamic series of inquiries to address the user-data communication while the relative position of the user-data communication is maintained in the queue;
modifying the dynamic series of inquiries based on identifiable aspects of the user-data communication and responses received during the virtual assistant session and based on client-specific contextual information gathered to facilitate certain of the data communications services provided to each of the respective clients, to identify an issue or topic associated with the user-data communication;
terminating the user-data communication and removing the user-data communication from the queue in response to an indication that the user-data communication was addressed during the virtual assistant session;
routing the user-data communication based on instructions stored by the management circuit, based on the relative position of the user-data communication in the queue, and in response to an indication that the user-data communication was not addressed during the virtual assistant session; and providing a transcript of the virtual assistant session to an agent in response to the routing;

wherein the identifiable aspects of the user-data communications include at least one of a keyword, a tone, and a phrase, and the data-center communications server is configured and arranged to queue data communications for each respective client entity, by:

identifying at least one keyword, tone, or phrase in the user-data communication;

correlating, using information stored by the management circuit, at least one issue or topic with the user-data communication based on comparing the identified keyword, tone, or phrase with client-specific information stored in a database associating keywords, tones, and phrases with different issues or topics; and generating the dynamic series of inquiries for the user-data communication, the dynamic series of inquires specific to the correlated issue or topic.

13. The apparatus of claim 12, wherein the identifiable aspects of the user-data communications include at least one of a keyword, a tone, and a phrase, and the data-center communications server is configured and arranged to queue data communications for each respective client entity, by:

receiving from an end-user from which the user-data communication originated, feedback indicating an extent to which the dynamic series of inquiries correspond with the issue or topic of the user-data communication; and updating the information stored by the management circuit for the associated client entity, in accordance with the received feedback.

14. The apparatus of claim 12, wherein the data-center communications server is configured and arranged to queue data communications for each respective client entity, by:

providing to each respective client entity, an option to specify a plurality of identifiable aspects that may be identified from user-data communications directed to the respective client entity, and the issue or topic correlated to each respective identifiable aspect.

15. The apparatus of claim 12, wherein the data-center communications server is configured and arranged to queue data communications for each respective client entity, by:

providing to a data communication device of an end-user from which the user-data communication has originated, the virtual assistant session as a display on a graphical user interface of the data communication device.

16. The apparatus of claim 12, wherein the data-center communications server is configured and arranged to queue data communications for each respective client entity, by:

generating a transcript of the dynamic series of inquiries and responses provided during the virtual assistant session;

routing the user-data communication to an agent of the client based on the relative position of the user-data communication in the queue and in response to the indication that the user-data communication was not addressed during the virtual assistant session; and providing the transcript of the virtual assistant session to the agent in response to the routing.

17. The apparatus of claim 12, wherein the data-center communications server is configured and arranged to queue data communications for each respective client entity, by:

retrieving from data sources associated with the respective client entity, aspects associated with the client-specific contextual information, including information pertaining to client relationships, particular projects of the respective client entity, or identified technological issues of the respective client entity; and supplementing the information stored by the management circuit with the client-specific contextual information.

18. The apparatus of claim 12, wherein the data-center communications server is configured and arranged to queue data communications for each respective client entity, by:

providing a graphical user interface to the end-users of each respective client entity, including selectable options to view, add, remove, and/or update the correlations between the identifiable aspects of the user-data communications and particular issues or topics associated with the respective client entity.

\* \* \* \* \*